H. T. FRENCH.
POISON DISTRIBUTER.
APPLICATION FILED MAY 4, 1914.
1,145,889.
Patented July 13, 1915.
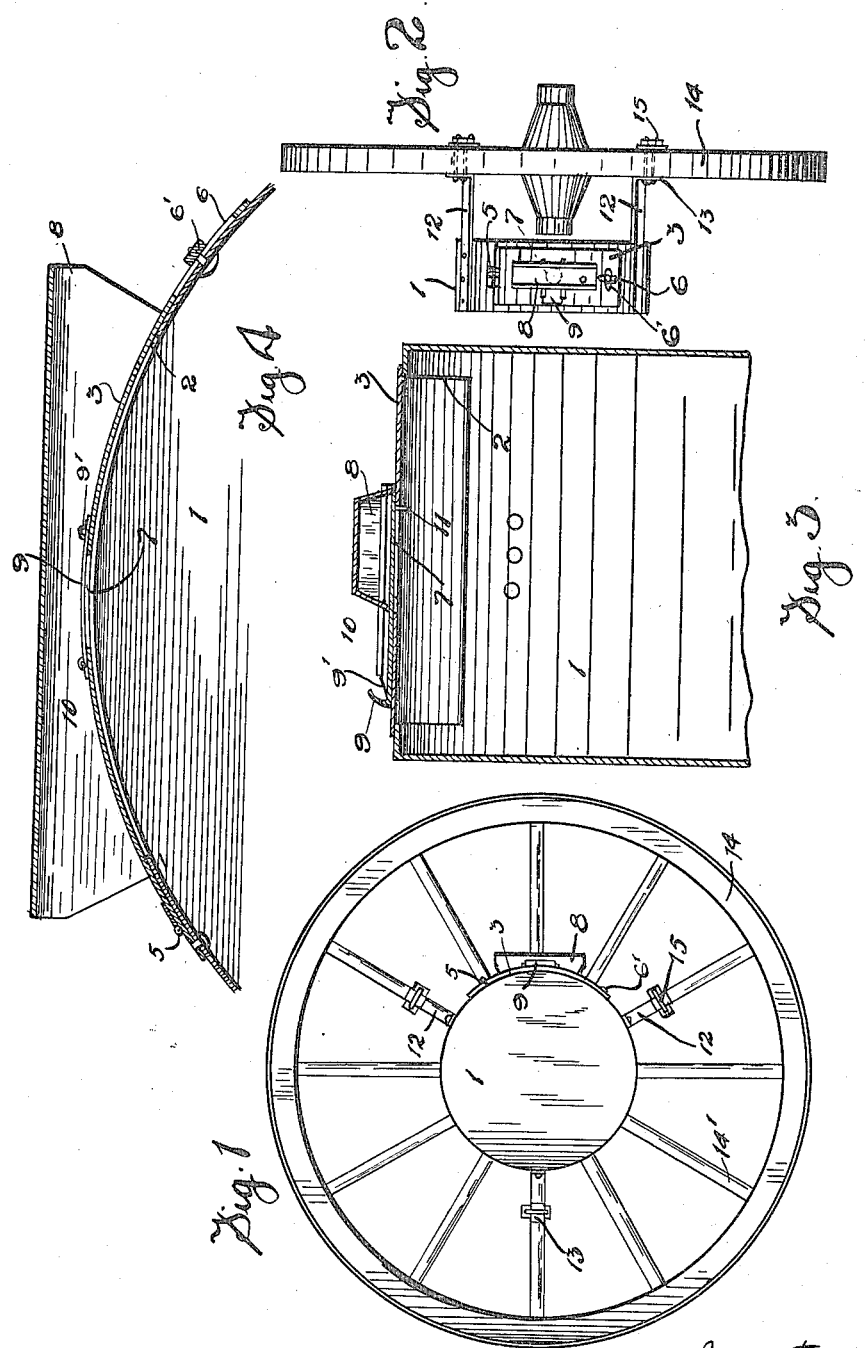

UNITED STATES PATENT OFFICE.

HENRY THOMAS FRENCH, OF WAINWRIGHT, ALBERTA, CANADA.

POISON-DISTRIBUTER.

1,145,889.  Specification of Letters Patent.  Patented July 13, 1915.

Application filed May 4, 1914. Serial No. 836,181.

*To all whom it may concern:*

Be it known that I, HENRY THOMAS FRENCH, of the town of Wainwright, in the Province of Alberta, Canada, have invented certain new and useful Improvements in Poison-Distributers, of which the following is the specification.

The invention relates to improvements in devices for distributing poison and the object of the invention is to provide an inexpensive efficient distributer which can be readily attached to the wheel of a vehicle or farm implement and can be set to distribute the poison contained in the device on the ground as the wheel rotates.

With the above object in view the invention consists essentially of a cylindrical container for the reception of the poison having a filling opening therein, a gate normally closing the opening, and having a feed opening therein, an open ended hood secured to the gate and covering the latter opening, an adjustable slide controlling the feed opening and means for attaching the container to a wheel, the parts being arranged and constructed as hereinafter more particularly described and later pointed out in the appended claims.

I might explain that the device is especially useful for distributing gopher poison. This is at present done by hand which is rather a laborious operation. With my invention the poison can be distributed much more effectively than by hand and it can be done simultaneously with the ordinary farm work, thereby necessitating no additional labor.

Referring now to the drawings, Figure 1 represents a face view of the device as it appears attached to a vehicle wheel. Fig. 2 represents a side view of the same. Fig. 3 represents an enlarged detailed cross sectional view through the container, gate and parts carried thereby. Fig. 4 represents an enlarged detailed longitudinal sectional view through the container, gate and parts carried thereby.

In the drawing like characters of reference indicate corresponding parts in each figure.

1 represents a cylindrical closed container having a gate or filling opening 2 in the side thereof.

3 is a gate hinged at one end as indicated at 5 to the container and having the other end fitted with a slot 6 which is designed to admit a catch button 6' carried by the container, the arrangements being such that the gate can be locked closed on the container by turning the button after it has been passed through the slot 6. The gate is fitted centrally with a feed opening 7 which is housed over by an open edged hood 8 permanently secured to the outer face of the gate.

9 is an adjustable slide carried by the gate and passing across the hood the slide being arranged to control the passage of material through the feed opening. This slide in the present case is formed from a metallic plate having the edges flanged upwardly as shown at 9' and received within guide plates 10 secured to the gate body, the guides passing through the hood at opposite sides of the opening 7.

A stop pin 11 is secured to the under side of the slide and limits the inner and outer positions thereof. By jamming the guide plates tightly against the flanges one can fix it so that the slide will not withdraw readily, in other words, it will retain any set position regardless of the movement of the distributer.

12 are arms permanently secured to the sides of the container and having their ends bent outwardly to form foot pieces as shown at 13.

In actual practice the distributer is connected to the wheel 14 of a vehicle, the foot pieces being fastened in any suitable way such as by U-bolts 15 to the spokes 14' of the wheel. The container when properly applied has the longitudinal axis thereof alined with the longitudinal axis of the wheel hub so that it turns with the wheel and on the same axis.

Poison is preferably put into the container before it is applied on the wheel, this being accomplished by opening the gate. To distribute the poison one has simply to open the slide and drive the vehicle. As the wheel turns the poison will escape through the feed opening and be distributed from the hood. The hood not only acts as a distributer but it also prevents the poison from escaping in event of the vehicle being stopped with the feed opening occupying an under position. In such a contingency the poison will heap up in the hood until it will stop the feed opening.

One can regulate the amount of poison fed by adjusting the slide as will readily be understood.

What I claim as my invention is,

1. A poison distributer comprising a cylindrical container having a gate opening in the side thereof, a gate carried by the container and normally closing the opening said gate being fitted with a feed opening, an adjustable slide controlling the feed opening, an open ended hood carried by the gate and housing over the feed opening and attaching means carried by the container, as and for the purpose specified.

2. A poison distributer comprising a cylindrical container having a filling opening in the side thereof, a hinged gate normally closing the opening, said gate being supplied with a feed opening, an adjustable slide controlling the feed opening and an open ended hood secured to the gate and housing over the feed opening, as and for the purpose specified.

Signed at Wainwright this 14th day of March 1914.

HENRY THOMAS FRENCH.

In the presence of—
 ROBERT HUNTER,
 L. G. RAWLING.

Copies of this patent may be obtained for five cents each, by addressing the "Commissioner of Patents, Washington, D. C."